(No Model.)
W. LODGE.
TAPER LATHE.
No. 593,359. Patented Nov. 9, 1897.
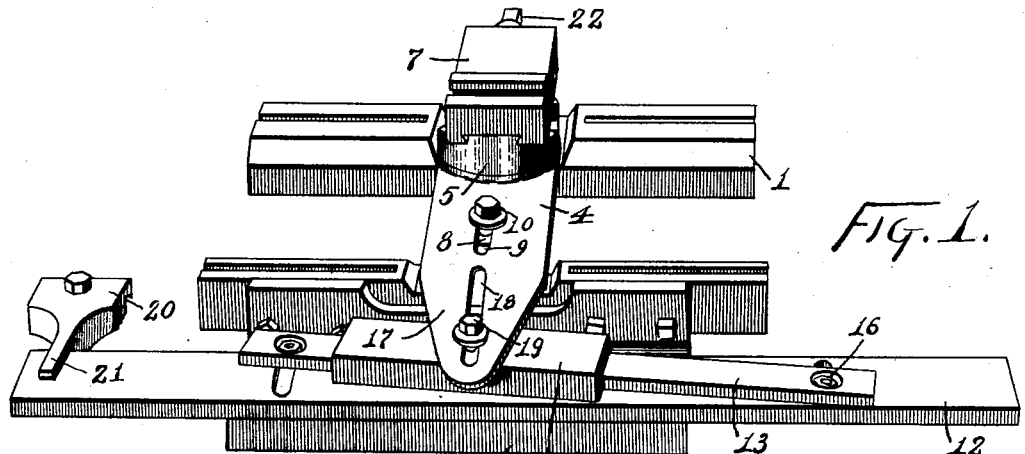
Fig. 1.
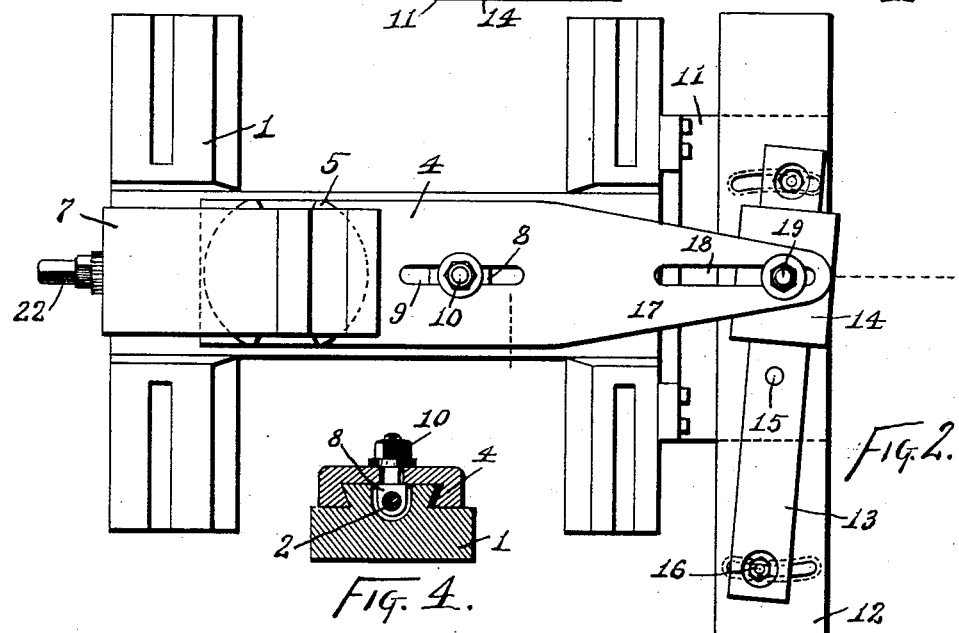
Fig. 2.
Fig. 4.
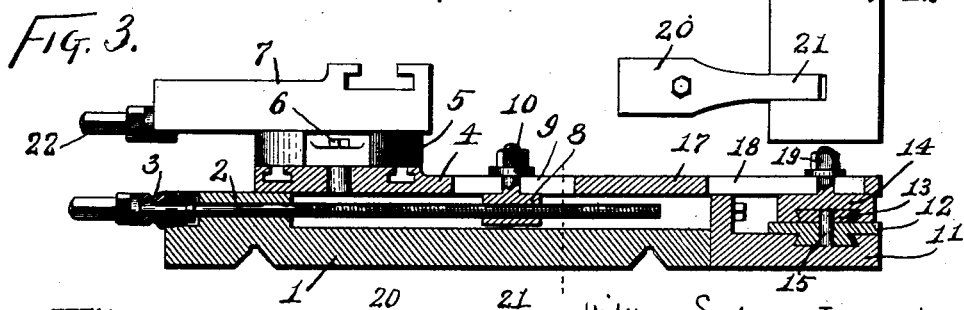
Fig. 3.
Fig. 5.
Witnesses:
E. R. Shipley.
M. S. Belden.
William Lodge Inventor
by James W. See
Attorney
THE NORRIS PETERS CO., PHOTO-LITHO., WASHINGTON, D. C.

UNITED STATES PATENT OFFICE.

WILLIAM LODGE, OF CINCINNATI, OHIO, ASSIGNOR TO THE LODGE & SHIPLEY MACHINE TOOL COMPANY, OF SAME PLACE.

TAPER-LATHE.

SPECIFICATION forming part of Letters Patent No. 593,359, dated November 9, 1897.

Application filed April 26, 1897. Serial No. 633,899. (No model.)

*To all whom it may concern:*

Be it known that I, WILLIAM LODGE, of Cincinnati, Hamilton county, Ohio, have invented certain new and useful Improvements in Taper-Lathes, of which the following is a specification.

This invention pertains to improvements in that class of taper-turning attachments for lathes known as "Slate's turning attachments," the same involving, essentially, an adjustable obliquely-set guide-bar at the back of the lathe on which moves a slipper connected with the sliding block of the lathe-carriage. (See Slate's patent, No. 46,152, of January 31, 1865.) In Slate's patented construction the guide-bar was supported by brackets on the lathe-bed and connection was made from the slipper to the cross-feed screw of the carriage, the cross-feed screw being journaled in the sliding block of the lathe-carriage. In such construction the cross-feed screw moved endwise with the sliding block of the lathe-carriage.

Slate's device was manufactured and largely marketed in a construction in which a bar extended from the slipper across the lathe-bed through the carriage and at its front end carried the bearing of the cross-feed screw. In such construction the cross-feed screw had an endwise movement when the taper attachment was in use, but had none when the guide-bar was set parallel with the lathe-bed. Miles (Patent No. 253,410, of February 7, 1882) supported the guide-bar on brackets adjustable along the lathe-bed, and he coupled the slipper directly to the sliding tool-block, the cross-feed screw being journaled in the sliding tool-block and threaded into the carriage, and hence requiring its crank, &c., to be removed when the taper attachment was to be used, the feed-screw of the compound rest in such case being depended upon for the adjustment of the depth of cut, &c. Warrall (Patent No. 332,578, of December 15, 1885) arranged the guide-bar to operate at the front of the lathe and on a compound rest, the usual cross-slide being necessarily locked to the lathe-carriage when the taper attachment was in action, the slipper being carried by the top of the compound rest. This device was of a temporary makeshift character, requiring to be removed from the lathe when not in use. Hazlet and Lord (Patent No. 450,016, of April 7, 1891) mounted Slate's guide-bar directly on the rear of the carriage instead of on the lathe-bed and provided a clamp upon the lathe-bed for fixing the bar against endwise motion when taper-turning was to be done, the guide-bar at other times traveling idly with the carriage. The slipper was coupled by a bar adjustable to the tool-block, and the screw of the compound rest was used for adjusting the depth of the cut, the main cross-feed screw being uncoupled when taper-work was to be done. The connection from the clamp on the lathe-bed to the guide-bar was in the form of a link in the plane of the center of width of the guide-bar. Johnson (Patent No. 503,088, of August 8, 1893) followed the plan of Hazlet and Lord, but coupled the slipper unadjustably to the bearing of the cross-feed screw, the cross-feed screw thus necessarily moving endwise while tapers were being turned. Instead of using the centrally-disposed link from the bed-clamp to prevent endwise motion of the guide-bars they turned the end of the guide-bar inwardly to engage the clamp very close to the edge of the lathe-bed.

The present invention embodies the general principle of Slate's device and is designed as an improvement upon the Hazlet and Lord construction with a view to avoiding defects in that construction and in all of the constructions to which reference has been made. The present invention will be readily understood from the following description, taken in connection with the accompanying drawings, in which—

Figure 1 is a rear perspective view of the lathe-carriage provided with a taper attachment embodying the present invention; Fig. 2, a plan of the same; Fig. 3, a vertical section of the lathe-carriage and taper attachment in a plane across the lathe; Fig. 4, a vertical transverse section of the bridge-piece of the lathe-carriage, together with the sliding block and cross-feed; Fig. 5, a side view of the bed-clamp.

In the drawings, 1 indicates the usual lathe-carriage; 2, the usual cross-feed screw; 3, the usual bearing for the cross-feed screw, mounted in the front of the carriage and supporting the cross-feed screw against endwise motion; 4, the sliding block, traveling, as usual, on the cross-dovetail of the carriage; 5, the usual base on the compound rest, mounted, as usual, for rotary adjustment on the sliding block; 6, the bolts uniting base 5 to the sliding block and engaging a circular T-slot, as usual; 7, the usual top slide of the compound rest; 8, the nut of the cross-feed screw; 9, a slot in sliding block 4 over the cross-feed screw; 10, a clamp-screw projecting from nut 8 upward through slot 9 and serving to clamp the nut to the sliding block, so that the sliding block is brought under the domination of the cross-feed screw when the lathe is to be used for ordinary turning and serving also as a means for releasing the sliding block from the domination of the cross-feed screw when the lathe is to be used for taper-work; 11, a bracket-plate secured permanently to the rear of the lathe-carriage and having a longitudinal guideway parallel with the lathe-bed; 12, a slide-bar carried by this bracket-plate and adapted for longitudinal motion on the guideway of the bracket-plate; 13, the obliquely-adjustable guide-bar of the taper attachment adjustably secured to the top of slide-bar 12; 14, the slipper sliding on the guide-bar; 15, the pivot on which guide-bar 13 is adjusted angularly with reference to slide-bar 12; 16, bolts engaging segmental slots and serving to secure the guide-bar to the slide-bar in adjusted position, the bracket-plate, slide-bar, guide-bar, slipper, &c., being substantially the same as in the Hazlet and Lord construction; 17, a rigid projection from sliding block 4, extending rearwardly over the slipper of the taper attachment; 18, a slot in projection 17 and disposed crosswise of the bars of the taper attachment; 19, a clamp-screw projecting from slipper 14 up through slot 18 and serving as means by which sliding block 4 may be locked to the slipper when the sliding block is to be brought under the domination of the taper attachment and by which the sliding block can be freed from the slipper when the sliding block is to be brought under the domination of the cross-feed screw; 20, the bed-clamp adapted to be secured to the rear edge of the lathe-bed, as in the case of Hazlet and Lord's construction; 21, a rearward rigid projection from the bed-clamp extending into engagement with a transverse slot in slide-bar 12, and 22 the usual cross-feed screw of the compound rest.

When the taper attachment is not to be used, then clamp 20 is loosened, screw 19 is loosened, and screw 10 is tightened. Under these conditions tool-block 4 is under the domination of cross-feed screw 2 and the taper attachment is entirely idle and travels with and is carried by the carriage, clamp 20 sliding idly on the lathe-bed and slot 18 moving freely over screw 19 as tool-block 4 is moved by the cross-feed screw.

When the taper attachment is to be employed, then the carriage is moved to such general position on the lathe-bed as corresponds with the point where the work is to be done, after which clamp 20 is tightened on the lathe-bed. Under these conditions slide-bar 12 and guide-bar 13 no longer travel with the carriage, but as the carriage moves the slipper traverses the guide-bar. The guide-bar is now to be set to the desired angle, after which screw 10 is to be loosened and screw 19 is to be tightened. Under these conditions tool-block 4 is entirely freed from the domination of cross-feed screw 2 and has been bound to slipper 14, so as to be under the domination of the taper attachment and move under the control of the angularly-set guide-bar 13.

It will be observed that cross-feed screw 2 is mounted as usual in lathes, and that the use of the taper attachment does not require that this screw be dismantled, as in the Miles construction, or that it be arranged for endwise motion, as in the Johnson construction. It will be further observed that the change from normal lathe conditions to taper-turning is readily effected by merely putting into active use either of screws 10 or 19, according to whether the tool-block is to be united with the cross-feed screw and freed from the taper attachment or alternatively united with the taper attachment and freed from the cross-feed screw. It is also to be observed that the rearward projection of clamp-tail 21 into engagement with slide-bar 12 avoids side strains upon the slide-bar, which side strains would have a tendency to interfere with the accuracy of taper-turning. The Hazlet and Lord link connection from the bed-clamp avoided the side strains, but was an otherwise undesirable and complex construction, while the inturning of the end of the slide-bar in the Johnson construction secured simplicity, but formed the slide-bar into a bell-crank lever having a tendency to disturb the accuracy of position of the slide-bar on the bracket-plate.

I claim as my invention—

1. In a taper-lathe, the combination, substantially as set forth, with a lathe-carriage, a cross-feed screw mounted therein and held against endwise motion, a sliding tool-block, a compound rest carried thereon, an angularly-adjustable guide-bar at the back of the carriage and a slipper thereon, of a screw on said slipper engaging a slot in a rearward extension of said tool-block and serving in temporarily uniting the tool-block to said slipper, a nut on said cross-feed screw, and a screw engaging said nut and a slot in the tool-block and serving in temporarily uniting the tool-block to the cross-feed screw.

2. In a taper-lathe, the combination, substantially as set forth, with a lathe-carriage, tool-block, guide-bar, guide-bar slipper, and means for uniting the tool-block to the slipper, of a bracket-plate rigidly supported by the lathe-carriage, a slide-bar supported on a guideway on said bracket-plate and in turn supporting said guide-bar, said slide-bar having a forwardly-open slot, and a clamp adapted to be attached to the lathe-bed and having a tail projecting rearwardly therefrom into engagement with said slot in the slide-bar, and substantially to the medial line thereof.

WILLIAM LODGE.

Witnesses:
E. C. KAMPE,
L. V. BRENER.